United States Patent
Erny et al.

[11] 3,753,615
[45] Aug. 21, 1973

[54] SCANNING APPARATUS

[75] Inventors: Daniel Richard Erny, Boonton; Merrill Brandle, Wanaque, both of N.J.

[73] Assignee: Van Dyk Research Corporation, Whippany, N.J.

[22] Filed: Apr. 26, 1972

[21] Appl. No.: 247,872

[52] U.S. Cl............................ 355/8, 355/65, 355/66
[51] Int. Cl............................................. G03g 15/04
[58] Field of Search.............................. 355/8, 65, 66

[56] References Cited
UNITED STATES PATENTS

| | | | |
|---|---|---|---|
| 3,591,277 | 7/1971 | Gardner | 355/8 |
| 3,554,640 | 1/1971 | Hoskins | 355/8 |
| 3,421,816 | 1/1969 | Robertson et al. | 355/8 |
| 3,480,360 | 11/1969 | Mallory et al. | 355/8 |

Primary Examiner—Samuel S. Matthews
Assistant Examiner—E. M. Bero
Attorney—Arthur L. Lessler

[57] ABSTRACT

An optical scanning arrangement for use in a xerographic copier, in which a mirror is rotated through a predetermined angle to scan the document to be copied. The angle through which the mirror is rotated varies according to the length of the document. A spring returns the mirror to its initial rest position. A shaft rotating at a fixed angular velocity is coupled to the mirror through an overrunning clutch, so as to limit the speed at which the mirror returns to its rest position to a velocity corresponding to that of the shaft. A linkage is provided to reduce the angular velocity of the mirror as the rest position of the mirror is approached, thus minimizing shock to the scanning mechanism.

11 Claims, 4 Drawing Figures

Patented Aug. 21, 1973

SCANNING APPARATUS

This invention relates to optical scanning apparatus, and is particularly useful in connection with, although not limited to, the scanning of documents to be reproduced by a xerographic copier.

In the practice of xerography, a xerographic surface comprising a layer of photoconductive insulating material affixed to a conductive backing is used to create and support electrostatic images. In the usual method of carrying out the process, the xerographic plate is electrostatically charged uniformly over its surface and then exposed to a light pattern of the image being reproduced to thereby dissipate the charge in the areas where light strikes the photoconductive layer. The undischarged areas of the layer thus form an electrostatic charge pattern in conformity with the configuration of the original light pattern.

The latent electrostatic image is then developed with a finely divided electrostatically attractable (electroscopic) material such as a resinous powder. The powder is held in image areas by the electrostatic charge on the photoconductive layer. Where the charge is greatest, the greatest amount of material is deposited; and where the charge is least, little or no material is deposited. Thus, a visible powder image is produced in conformity with the light image of the copy being reproduced. The powder image is subsequently transferred to a sheet of paper or other surface and suitably affixed (usually by application of heat) to thereby form a permanent print of the desired image.

When a document is to be copied, transfer of the image thereon to the xerographic plate is usually accomplished by scanning the document with a movable optical scanning element, e.g. a mirror. Where documents of varying length are to be copied, the movement of the scanning optical element must vary accordingly. Where high speed copying operation is to be provided, the scanning optical element must rapidly return to its initial position after each scan, in order to minimize the loss of time between the successive scans.

Where a mirror is employed as the optical scanning element, for example, scanning of documents of varying length may be implemented by mounting the mirror on a shaft, and coupling the shaft for rotation by a motor through a suitable clutch. The clutch may be engaged for a length of time corresponding to the time required to scan a document of a given length, at a velocity determined by the angular velocity of the motor shaft. A spring may be provided to return the mirror to its initial position when the clutch is disengaged. A scanning system of this type is described in copending application Ser. No. 221,310, filed Jan. 27, 1972, entitled "Apparatus for Imparting Intermittent Rotation to a First Member in Rotating Registry with a Second Member," and assigned to the assignee of the instant application.

In order to provide uniformly repeatable operation of the scanning system, it is necessary to provide a mechanical stop to establish the initial rest position of the scanning mirror. When the scanning mirror, accelerated by the return spring to a high angular velocity, is abruptly brought to a halt by contact with the mechanical stop, the resulting shock causes undesirable vibrations and disturbs the precise alignment of the mirror and associated components of the scanning system. The use of a viscous damper to reduce such shock and vibration greatly decreases the angular velocity at which the mirror returns to its rest position, thus substantially reducing the rate at which copies can be produced by the machine.

Accordingly, an object of the present invention is to provide an improved scanning apparatus in which shock and vibration are reduced, with a relatively small consequent reduction in the speed of operation of the scanning apparatus.

As herein described, there is provided scanning apparatus which includes an optical scanning element mounted for rotation on a first shaft. First drive means is provided for rotating the shaft from an initial rest position through a predetermined angle in a scanning direction. Second drive means is provided for rotating the shaft in the opposite direction to return the shaft to its rest position. The second drive means includes means for limiting the angular velocity of rotation of the first shaft in the aforementioned opposite direction to a predetermined value, and for decreasing the angular velocity of the shaft as it approaches its rest position.

Figure 1:
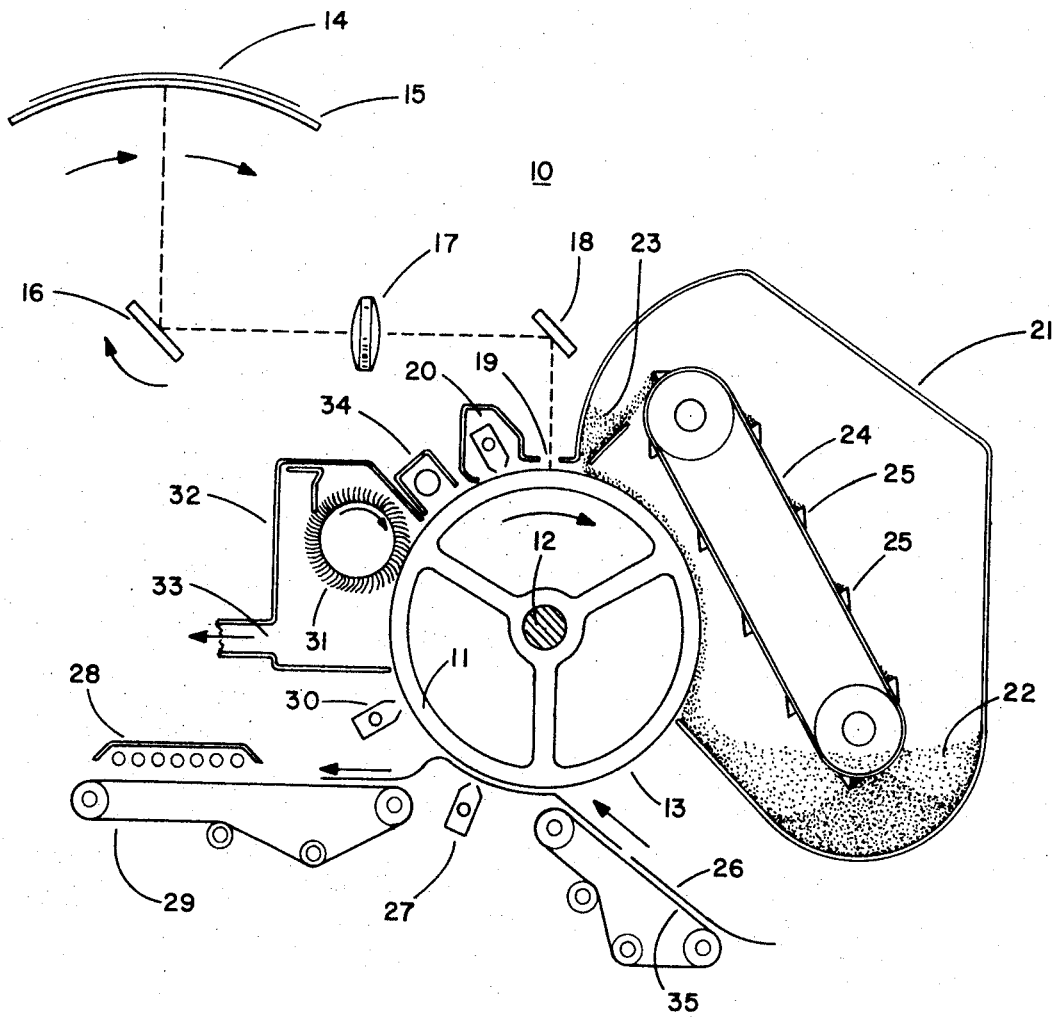
FIG. 1 shows xerographic copying apparatus generally typical of the prior art.

The xerographic copying apparatus 10 shown in FIG. 1, which apparatus is generally typical of the prior art, comprises a number of operating stations situated about the periphery of a rotatable drum 11. The drum 11 is rotatably mounted on an axle 12, and is continually rotated by a suitable drive motor (not shown) while copies are to be made. The outer surface 13 of the drum 11 is coated with a relatively hard photoconductive material, such as vitreous selenium.

A document 14 bearing an image to be copied is placed (face down) on a curved transparent support plate 15. The image to be copied is then illuminated by a suitable light source (not shown) through the transparent support plate 15, and scanned by a rotatable mirror 16, which reflects light from the document 14 through a lens 17 and a fixed mirror 18 onto the photoconductive surface 13 of the rotating drum 11, through the exposure slot 19.

The rotation of the scanning mirror 16 is accurately synchronized with the rotation of the drum 11, so that the linear velocity at which the surface of the document 14 is scanned and the image thereof is projected through the aperture 19 is equal to the linear velocity of the photoconductive layer 13 disposed on the outer periphery of the drum 11.

Prior to exposure to the image information bearing light beam through the aperture 19, the photoconductive surface 13 of the drum 11 is passed under a corona emitter or corotron 20, which charges the photoconductive surface 13 to establish a uniform electrostatic charge density thereon.

Upon passing beneath the exposure slot 19, the charged photoconductive surface 13 is selectively discharged in accordance with the pattern of the image on the document 14 to be copied, resulting in the formation of a latent electrostatic image on at least a portion of the photoconductive surface 13 (the size of the portion of the photoconductive surface which contains the latent electrostatic image is dependent upon the size of the document 14 to be copied).

As the drum 11 continues to rotate, the latent electrostatic image on the photoconductive surface 13 enters the developer tank 21. Situated in the lower portion or sump region of the developer tank 21 is a granular developer mixture 22, which consists of resin coated steel beads and electroscopic toner powder.

The developer mixture is continually carried from the sump region of the developer tank to a hopper 23 at or near the top of the developer tank by means of a conveyor belt 24 having a plurality of carrier buckets 25 affixed thereto.

As the drum 11 continues to rotate, the developer mixture in the hopper 23 continually flows out the orifice at the bottom of the hopper, and cascades over the photoconductive surface 13 of the drum. As the developer mixture cascades over the photoconductive surface, toner particles are attracted away from the moving carrier beads and adhere to the charged portions of the photoconductive surface, thus converting the latent electrostatic image thereon to a corresponding visible pattern of pigmented or dyed toner particles. The developer mixture (less any toner particles which have adhered to the latent electrostatic image on the photoconductive surface 13 of the drum 11) falls back into the sump of the developer tank 21 after the developer has cascaded over the photoconductive surface 13.

Upon further rotation of the drum 11, the pattern of toner particles (the toner particles being electroscopically adherent to the charged areas of the latent electrostatic image on the photoconductive surface 13) is brought into juxtaposition with a moving paper 26, which is caused to progress at a velocity equal to the peripheral velocity of the drum 11, so that there is substantially no relative motion between the paper 26 and the adjacent portion of the periphery of the drum 11.

The paper 26 is moved toward the transfer region of the drum 11 by a transport comprising a porous moving belt 35, the paper 26 being retained in contact with the belt 35 by air pressure produced by the action of a vacuum source (not shown) which communicates with the interior of the region encompassed by the belt 35.

As the toner pattern (corresponding to the latent electrostatic image which in turn corresponds to the image of the document 14) passes the moving paper 26 in close proximity thereto, an image tranfer corona emitter or corotron 27 attracts the toner particles away from the photoconductive surface 13 and onto the adjacent portion of the moving paper 26. The toner pattern is thus transferred onto the moving paper 26, and is then passed under a radiant heater or fuser 28 which fuses te toner particle pattern to the paper 26 to form thereon a permanent copy of the image on the document 14.

The paper 26 is moved along beneath the fuser 28 by a porous moving belt 29, the paper 26 being retained in contact with the belt 29 by air pressure produced by the action of a vacuum source (not shown) which communicates with the interior of the region encompassed by the belt 29.

After the toner pattern has been transferred from the photoconductive surface 13 of the drum 11 onto the paper 26, some residual toner particles remain on the drum surface. In order to remove these residual toner particles, the photoconductive surface 13 is subsequently exposed to a further corena emitting devIce or corotron 30 which reduces any residual charge remaining on the photoconductive surface, thus reducing or cancelling the electrostatic attraction between the residual toner particles and the adjacent photoconductor surface.

A rotating brush 31 situated in a substantially dust-tight compartment 32 mechanically removes any remaining toner particles from the photoconductive surface 13 of the drum 11, the toner particles so removed being drawn out through the conduit 33 by air pressure as a result of the application of a suitable vacuum source (not shown) to the conduit 33. Before the toner-laden air is returned to the atmosphere, it is filtered by suitable means (not shown) to remove the toner particles therefrom.

After the residual toner particles have been removed from the photoconductive surface 13 by the action of the brush 31 and the vacuum source associated therewith, the photoconductive surface 13 is irradiated by light from a source 34, to insure substantialy complete discharge of the photoconductive surface.

Thereafter the corona emitter or corotron 20 recharges the photoconductive surface 13 in a uniform manner in preparation for the next cycle of machine operation.

Figure 2:
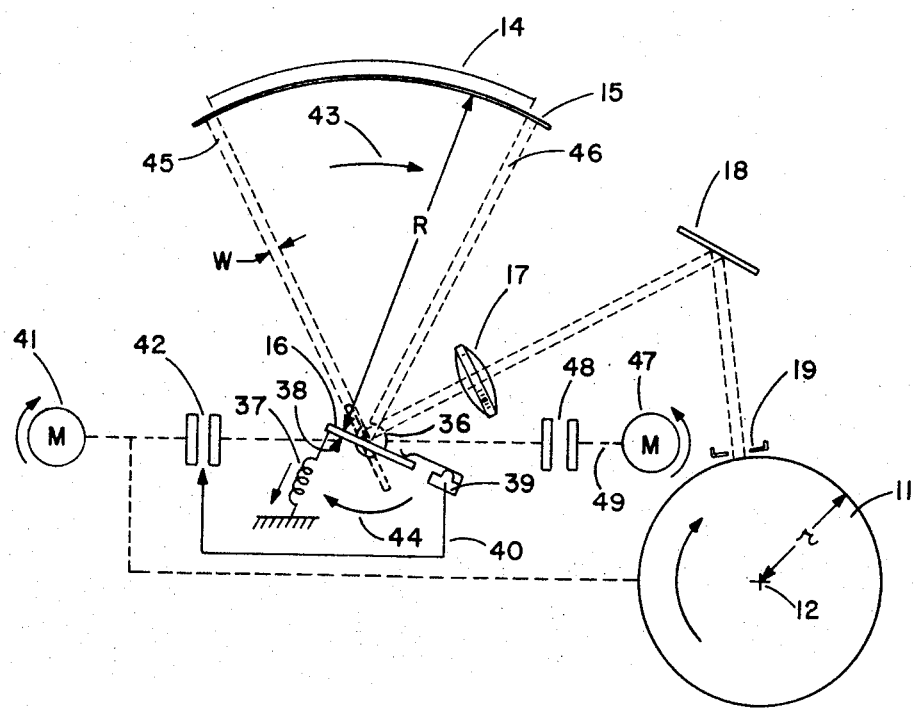
FIG. 2 shows, in schematic form, the general configuration of the scanning apparatus according to an embodiment of the present invention.

As seen in more detail in FIG. 2, mirror 16 is normally biased in a rest position as indicated by the solid line representation of the mirror. The mirror 16 is secured to a rotatable shaft 36, and is normally biased in its rest position by a spring 37, which urges th mirror against the mechanical stop 38. A limit switch 39 is mechanically coupled to the mirror 16 and provides a signal on line 40 which indicates when the mirror 16 is in its rest position.

A scan drive motor 41, which rotates at a given angular velocity, provides torque for rotation of the mirror 16 in the scanning direction, as indicated by the arrows 43 and 44. The scan drive motor 41 is coupled to the shaft 36 through a scan drive clutch 42, which is engaged when the document 14 is to be scanned, and is disengaged after the entire length of the document 14 has been scanned. The dashed lines 45 indicate the position of the scanning "beam" when the mirror 16 is in its rest position, while the dashed lines 46 indicate the position of the scanning "beam" in the maximum upscan position of the mirror 16, as indicated by the dashed line representation of the mirror. Since the scanning "beam" has a finite width w (typically on the order of 1 inch), it is necessary to overscan the document 14 by an amount equal to the width of the "beam", in order to insure that the photoconductive surface of the drum 11 is equally exposed to all portions of the document 14 to be copied.

The angular velocity of rotation of the shaft 36 is given by $$W_s = W_d \cdot r/2R, \qquad (1)$$

where $W_s$ is the angular velocity at which the shaft 36 is rotated to cause the mirror 16 to scan the document 14, $W_d$ is the angular velocity of rotation of the shaft 12 on which the drum 11 is mounted, $R$ is the scan radius, and $r$ is the distance from the axis of rotation of the shaft 12 to the photoconductive surface of the drum 11.

When the mirror 16 is rotated in the scanning direction by the scan drive motor 41 through the scan drive clutch 42, at an angular velocity $W_s$ as defined by Equation 1, the linear speed at which the document 14 is scanned is equal to the linear speed at which the photoconductive surface of the drum 11 passes the exposure slot 19, thus insuring that the electrostatic image formed on the photoconductive surface of the drum 11 accurately corresponds to the image on the document 14.

When the scan drive clutch 42 has been engaged for a sufficient time so that the scanning mirror 16 has moved from the position indicated by the solid line representation thereof to the position indicated by the dashed line representation thereof, i.e. when the scanning "beam" has moved to the position indicated by the dashed lines 46 at the end of the document 14, the scan drive clutch 42 is disengaged by a suitable control signal, and the mirror 16 is returned to its rest position by the scan return spring 37. The scan return signal generated by the limit switch 39 on line 40 prevents the scan drive clutch 42 from engaging before the scanning mirror 16 is returned to its rest position, thus preventing a premature start of the next cycle of machine operation to produce a succeeding copy.

It has been found that the scan return spring 37 accelerates the scanning mirror 16 to a high angular velocity, so that the scanning mirror 16 and its associated components are subjected to considerable shock and vibration when the scanning mirror 16 encounters the mechanical stop 38.

In order to reduce shock and vibration, without unduly reducing the speed with which the scanning mirror 16 returns from its maximum up-scan position to its rest position, a scan return motor 47 and a scan return clutch 48 are provided.

The scan return motor 47 rotates a second shaft 49 at a constant angular velocity $W_r$, the shaft 49 being connected to the scan return clutch 48. The scan return clutch 48 is of the one-way or overrunning type, and acts to couple the shaft 36, upon which the scanning mirror 16 is mounted, to the shaft 49 whenever the angular velocity of the shaft 36 in the scan return direction (i.e., opposite to the direction of the arrows 43 and 44) is greater than the angular velocity of the shaft 49, which rotates in a direction corresponding to the scan return direction. Since the shaft 49 is rotated at a constant angular velocity by the scan return motor 47, the aforementioned arrangement acts to limit the angular velocity of rotation of the shaft 36 to a value corresponding to the angular velocity of rotation of the shaft 49.

The angular velocity of the shaft 49 need not necessarily be equal to the desired maximum angular velocity of the shaft 36 in the scan return direction, since suitable gearing may be provided between the shaft 36 and the clutch 48, or between the clutch 48 and the shaft 49, to establish any desired ratio between the angular velocities of the shafts 36 and 49.

As shown in FIG. 2, the scan drive motor 41 also serves the function of rotating the drum 11, thus insuring that synchronism between rotation of the shafts 36 and 12 is maintained at all times. This scan drive system is more fully described in the aforementioned copending application Ser. No. 221,310.

It is not necessary to provide separate motors 41 and 47; if desired, a single motor may be provided, with suitable gearing to establish the desired angular velocities at the shafts coupled to the clutches 42 and 48.

A suitable control system for operating the scan drive clutch 42 is shown in copending application Ser. No. 224,563, filed Feb. 8, 1972, entitlted "Variable Sheet Length Paper Feed and Cutting System," and assigned to the assignee of the instant application.

With the aforementioned scan return arrangement, the scan return spring 37 accelerates the scan mirror 16 and the shaft 36 until the angular velocity of the shaft 36 reaches the angular velocity of the shaft 49, causing the overrunning clutch 48 to engage; thereafter the angular velocity of the shaft 36 is maintained at a value corresponding to that of the shaft 49, until the overrunning clutch 48 disengages when the angular velocity of shaft 36 is reduced by a suitable linkage (not shown in FIG. 2).

Figure 3:
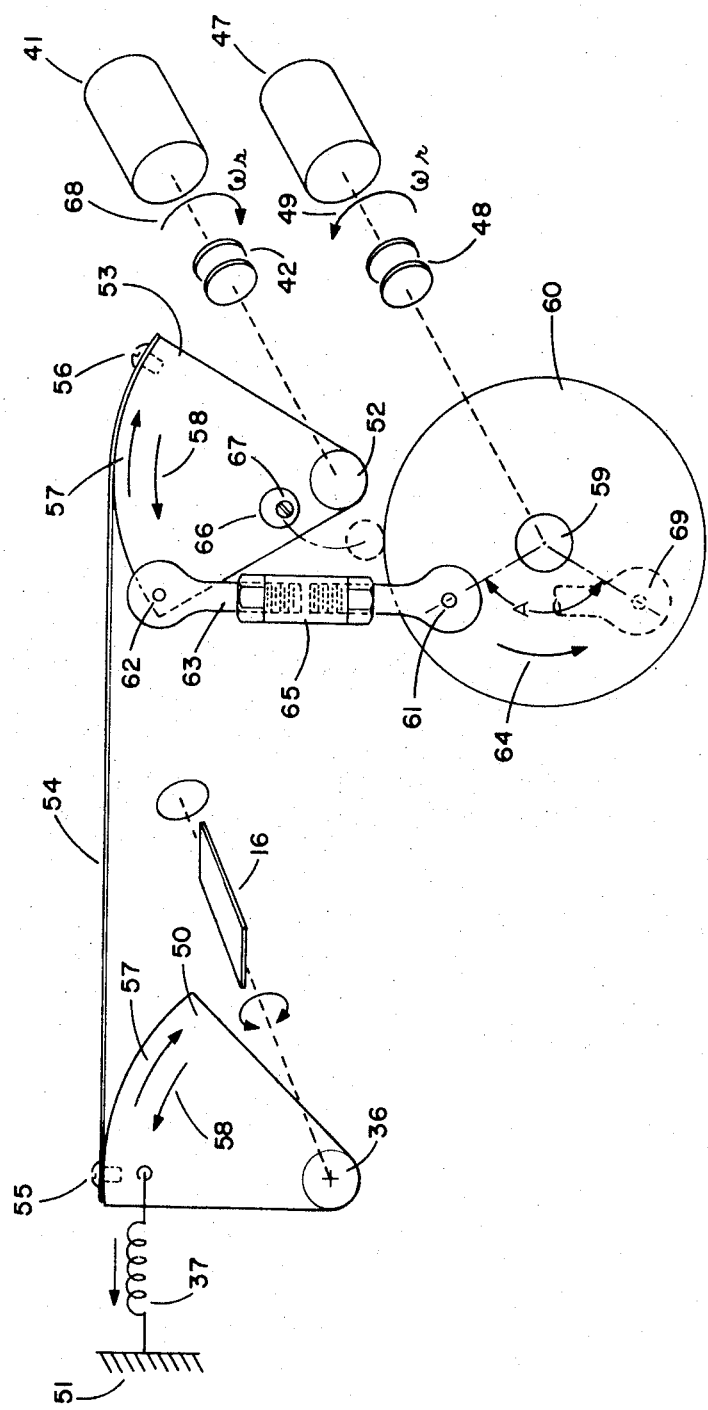
FIG. 3 shows a number of the mechanical components employed in the scanning apparatus of FIG. 2.

The arrangement of the principal mechanical components employed in the scanning system is shown in greater detail in FIG. 3.

Secured to the shaft 36 is a first member 50 shaped in the form of a sector. The scan return spring 37 is secured at one end to a fixed support 51 and at the other end to a point on the sector member 50 spaced from the shaft 36, to which the mirror 16 is also secured.

Another shaft 52 is disposed parallel to and spaced apart from the shaft 36. Secured to the shaft 52 is a second member 53 in the form of a sector.

A flexible tension-bearing web 54 connects a point on the periphery of the first sector member 50 to a corresponding point on the periphery of the second sector member 53, the web 54 being secured at said points by screws 55 and 56 respectively.

Preferably, the sector members 50 and 53 are formed of a relatively rigid material such as iron, steel, or aluminum, and the web 54 is a steel or beryllium copper belt.

The shafts 36 and 52, sectors 50 and 53, connecting web 54 and scan return spring 37 form a modified parallelogram-type linkage, so that when the shaft 52 is driven in either the scanning direction (as indicated by the arrows 57) or the scan return direction (as indicated by the arrows 58), the shaft 36 and scanning mirror 16 rotate in synchronism with the shaft 52.

Preferably, the sector members 50 and 53 are designed to have a relatively low moment of inertia about the shafts 36 and 52.

Another shaft 59 is provided parallel to the shafts 36 and 52. Secured to the shaft 59 is a disc 60. Secured to the disc 60 at a point spaced from the shaft 59 is a pivot pin 61. Secured to second sector member 53 at a point spaced from the shaft 52 is a second pivot pin 62. The pivot pins 61 and 62 are coupled to one another by a connecting link 63, which is eccentrically pivotally secured to the second sector member 53 and disc 60 by the pivot pins, in such a manner that the disc 60 rotates in the direction indicated by the arrow 64 when the second sector member 53 rotates in the scan return direction indicated by the arrows 58.

The connecting link 63, which comprises a relatively rigid material such as iron or steel, includes a turnbuckle mechanism 65 to permit adjustment of the length of the connecting link to a desired value.

A stop 66 is secured to and extends from the surface of the second sector member 53, at a point spaced from the shaft 52. The second sector member 53 is situated in a plane displaced from the plane of the disc 60, so that when the shaft 52 is rotated in the scan return direction, as indicated by the arrows 58, the stop pin 66 abuts against the periphery of the disc 60 to prevent further rotation of the shafts 36 and 52, and thereby establish a rest position of the scanning mirror 16.

The stop pin 66 is secured to the second sector member 53 by a screw 67, which extends through an eccentrically drilled hole in the stop pin 66. This arrangement permits adjustment of the rest position of the scanning mirror 16 to a precisely determined value.

The scan drive motor 41 rotates shaft 68 at a constant angular velocity $W_s$ corresponding to the desired rate of scan of the mirror 16.

The scan return motor 47 rotates the shaft 49 at an angular velocity $W_r$ corresponding to the maximum permissible angular velocity of rotation of the shaft 36 and mirror 16 in the scan return direction indicated by the arrows 58.

The clutch 42 provides coupling between the shafts 52 and 68, while the overrunning or one-way clutch 48 provides selective coupling between the shafts 59 and 49. Preferably, the clutch 42 is of a rapid engaging, magnetically activated disc type exhibiting substantially no slip during engagement. The overrunning clutch 48 is preferably of a type exhibiting negligible backlash, such as a Torrington needle clutch. The overrunning clutch 48 is connected to the shafts 59 and 49 in such a manner that the clutch 48 engages only when the angular velocity of the shaft 59 in the direction indicated by the arrow 64 tends to exceed the angular velocity of rotation of the shaft 49. Under this condition, the engagement of the overrunning clutch 48 prevents the angular velocity of the shaft 59 from exceeding the angular velocity $W_r$ of the shaft 49.

The scanning mechanism shown in FIG. 3 is illustrated with the scanning mirror 16 in the maximum up-scan position. The clutch 42 is caused to disengage when the maximum up-scan position is reached, and the scan return spring 37 then proceeds to rotate the sector member 50, the shaft 36, the sector member 53, the shaft 52, the disc 60 (by way of the connecting link 63) and the shaft 59 in the scan return direction, as indicated by the arrows 58 and 64. The angular velocities of the shafts 36, 52, and 59 continue to increase under the influence of scan return spring 37, until he angular velocity of the shaft 59 reaches a value equal to $W_r$, the angular velocity at which the shaft 49 is rotated by the scan return motor 47. At this point, the overrunning clutch 48 engages, thereby limiting the angular velocities of the shafts 36, 52 and 59 to a predetermined value.

As the disc 60 rotates in the direction indicated by the arrow 64, the pivot pin 61 and the connecting link 63 secured thereto move downward, and the angular velocity of the shaft 52 decreases due to the eccentric action of the connecting link 63 in conjunction with the disc 60. The angular velocity with which stop pin 66 contacts the periphery of disc 60 is independent of the angle of scan. The dimensioning and spacing of the shafts 52 and 59, the sector member 53, the disc 60, and the connecting link 63 are selected so that the angular velocity of the shaft 52 is at a relatively low value (but not zero) when the stop pin 66 engages the periphery of the disc 60 to establish the rest position of the shaft 36 and mirror 16. When the lower portion of the connecting link 63 reaches the position indicated by the dashed representation 69, the stop pin 66 engages the periphery of the disc 60, preventing further downward movement of the connecting link 63, thus reducing the angular velocity of rotation of the disc 60 and the shaft 59, and causing the overrunning clutch 48 to disengage. Both disc 60 and stop pin 66 have hardened steel surfaces to minimize wear.

When the next scanning cycle is initiated by engagement of the scan drive clutch 42, the scan drive motor 41 rotates the shaft 52 in the direction indicated by the arrows 57, thus causing the connecting link 63 to move upward. Thus the disc 60 reciprocates as the shafts 36, 52 and 59 rotate to cause the scanning mirror 16 to scan through the desired angle and return to its initial rest position. The disc 60 reciprocates in such a manner that the pivot pin 61 rotates about the shaft 59 within an angular sector A. Preferably, the size and location of the angular sector A should be such that a line extending between the pivot pins 61 and 62 at no time passes through the center of the shaft 59. If such a condition is permitted to occur, the connecting link 63 might lock in a corresponding position, thus rendering the mechanism shown in FIG. 3 inoperative.

Figure 4:
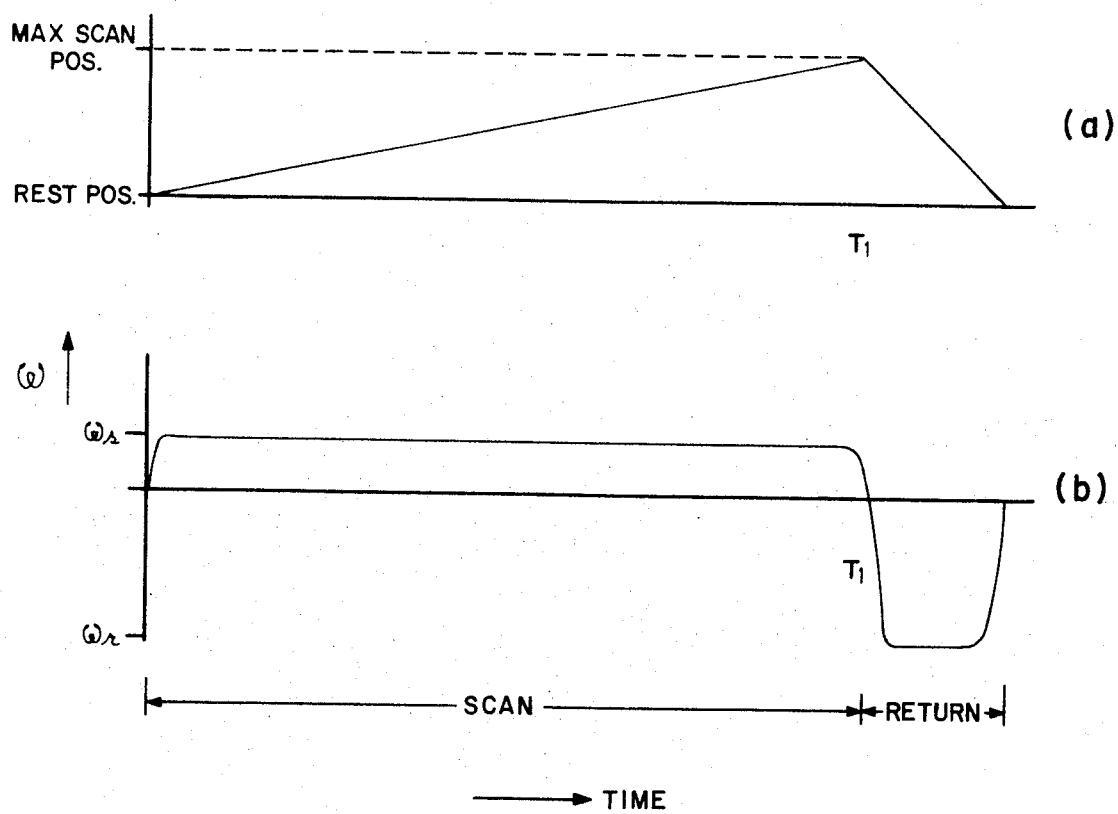
FIG. 4 shows characteristic curves illustrating the operation of the scanning apparatus shown in FIGS. 2 and 3.

The characteristic curves shown in FIG. 4 illustrate the operation of the mechanism shown in FIGS. 2 and 3, and show the variation in angular position and velocity of the shaft 36 throughout a single scanning cycle.

As seen in FIG. 4, the shaft 36 and scanning mirror 16 rotate at a constant angular velocity $W_s$ to scan the document 14. When the maximum up-scan position is reached at time $T_1$, scan drive clutch 42 is disengaged, and the scan return spring 37 returns the shaft 36 and scanning mirror 16 to their initial rest position. As shown in FIG. 4 (b), the scan return spring 37 causes the angular velocity of the shaft 36 and mirror 16 to rapidly decrease to zero in the scanning direction at time $T_1$, and then to rapidly increase in the scan return direction until the angular velocity of the shaft 36 in the scan return direction reaches a value equal to $W_r$, at which time the overrunning clutch 48 engages to limit the angular velocity of the shaft 36 in the scan return direction to $W_r$. As the disc 60 rotates in the direction indicated by the arrow 64 in FIG. 3, the eccentric action of the connecting link 63 causes the angular velocity of the shafts 36 and 52 to decrease so that the angular velocities of the shafts 36 and 52 are near zero, (but not at zero) when the stop pin 66 engages the periphery of the disc 60.

By limiting the maximum angular velocity at which the shaft 36 reutrns to its rest position, and decreasing the angular velocity of the shaft 36 as the rest position is approached, the mechanism shown in FIGS. 2 and 3 greatly reduces shock and vibration incident to the operation of the scanning system, thereby increasing scan precision and reliability. This improvement is realized with minimal loss of time required for completion of a scanning cycle.

We claim:

1. Scanning apparatus for reciprocating an optical scanning element, comprising:
   a first shaft to which said optical element may be secured;
   a second shaft;

a scan return limit drive means for rotating said second shaft at a predetermined angular velocity;
a third shaft;
a disc secured to said third shaft;
an overrunning clutch for coupling said second shaft to said third shaft;
a fourth shaft;
a scan drive motor for rotating said fourth shaft at a desired angular velocity;
means including a scan drive clutch for coupling said fourth shaft to said first shaft to cause said first shaft to rotate from an initial rest position through a predetermined angle in a scanning direction;
means including a spring for disposing said first shaft in said rest position and for rotating said first shaft in the opposite direction to return said first shaft to said rest position after said first shaft has been rotated through said predetermined angle;
a first member mounted for rotation in synchronism with the rotation of said first shaft; and
means, including a connecting link eccentrically pivotally secured at opposite ends thereof to said disc and said first member, for coupling said first shaft to said third shaft to prevent the angular velocity of rotation of said first shaft in said opposite direction from exceeding a value determined by the predetermined angular velocity of said second shaft, and for decreasing the angular velocity of rotation of said first shaft in said opposite direction as said first shaft returns to said rest position.

2. Scanning apparatus according to claim 1, further including means for permitting said scan drive clutch to couple said fourth shaft to said first shaft only when said first shaft is in said rest position.

3. Scanning apparatus according to claim 1, further including a fifth shaft disposed parallel to said first shaft, said fifth shaft being coupled to said fourth shaft through said scan drive clutch, said first member being secured to said fifth shaft.

4. Scanning apparatus according to claim 3, further including a second member secured to said first shaft, a spring secured to said second member to cause said first shaft to rotate in said opposite direction, and a flexible strip coupling a point of said first member remote from said fifth shaft to a point of said second member remote from said first shaft.

5. Scanning apparatus, comprising:
an optical scanning element mounted for rotation on a first shaft:
first drive means for rotating said first shaft from an initial rest position through a predetermined angle in a scanning direction; and
second drive means for rotating said first shaft in the opposite direction to return the shaft to said rest position,
said second drive means including (i) scan return sprinG means for rotating said first shaft in said opposite direction, (ii) a second shaft, (iii) scan return limit drive means for rotating said second shaft at a given angular velocity, (iv) an overrunning clutch, (v) a third shaft coupled to said second shaft through said overrunning clutch, (vi) a disc secured to said third shaft, (vii) a first member coupled for rotation with said first shaft, and (viii) a connecting link eccentrically pivotally secured at opposite ends thereof to said first member and said disc, whereby said first and second shafts are coupled only when the angular velocity of rotation of said first shaft in said opposite direction has a value corresponding to at least said given angular velocity of said second shaft, and the angular velocity of rotation of said first shaft in said opposite direction decreases as said first shaft approaches said rest position.

6. Scanning apparatus according to claim 5, wherein said first drive means includes a scan drive motor, and means including a scan drive clutch for coupling said motor to said first shaft.

7. Scanning apparatus according to claim 6, further including means for permitting said scan drive clutch to couple said motor to said first shaft only when said shaft is in said rest position.

8. Scanning apparatus according to claim 5, wherein said first drive means includes a fourth shaft, a scan drive motor for rotating said fourth shaft, and means including a scan drive clutch for coupling said fourth shaft to said first shaft.

9. Scanning apparatus according to claim 8, further including means for permitting said scan drive clutch to couple said fourth shaft to said first shaft only when said first shaft is in said rest position.

10. Scanning apparatus according to claim 9, further including a fifth shaft disposed parallel to said first shaft, said fifth shaft being coupled to said fourth shaft through said scan drive clutch, said first member being secured to said fifth shaft.

11. Scanning apparatus according to claim 10, further including a second member secured to said first shaft, and a flexible strip coupling a point of said first member remote from said fifth shaft to a point of said second member remote from said first shaft.

* * * * *